United States Patent [19]
Veligdan

[11] Patent Number: 6,014,239
[45] Date of Patent: Jan. 11, 2000

[54] OPTICAL MICROPHONE

[75] Inventor: James T. Veligdan, Manorville, N.Y.

[73] Assignee: Brookhaven Science Associates, Upton, N.Y.

[21] Appl. No.: 08/989,350

[22] Filed: Dec. 12, 1997

[51] Int. Cl.[7] .......................... H04B 10/02; H04B 10/00; H04B 10/12; H04R 25/00
[52] U.S. Cl. .......................... 359/172; 359/150; 359/149; 359/151; 359/191; 359/173; 381/172; 381/170
[58] Field of Search ...................................... 359/151, 149, 359/150, 173, 191; 381/172, 170

[56] References Cited

U.S. PATENT DOCUMENTS

| | | | |
|---|---|---|---|
| 3,470,329 | 9/1969 | Young | 179/121 |
| 4,238,856 | 12/1980 | Bucaro et al. | 455/614 |
| 4,412,105 | 10/1983 | Muscatell | 179/121 R |
| 4,479,265 | 10/1984 | Muscatell | 455/605 |
| 5,262,884 | 11/1993 | Buchholz | 359/151 |
| 5,414,509 | 5/1995 | Veligdan | 356/349 |
| 5,910,855 | 6/1999 | Thomas | 359/285 |

OTHER PUBLICATIONS

Machine Design, "Optical Microphones Mix Light and Sounds," Dec.12, 1994, p. 71.

*Primary Examiner*—Jason Chan
*Assistant Examiner*—Agustin Bello
*Attorney, Agent, or Firm*—Margaret C. Bogosian

[57] ABSTRACT

An optical microphone includes a laser and beam splitter cooperating therewith for splitting a laser beam into a reference beam and a signal beam. A reflecting sensor receives the signal beam and reflects it in a plurality of reflections through sound pressure waves. A photodetector receives both the reference beam and reflected signal beam for heterodyning thereof to produce an acoustic signal for the sound waves. The sound waves vary the local refractive index in the path of the signal beam which experiences a Doppler frequency shift directly analogous with the sound waves.

11 Claims, 2 Drawing Sheets

OPTICAL MICROPHONE

CROSS REFERENCE TO RELATED APPLICATION

The present application is related to concurrently filed patent application Ser. No. 08/989,275 filed Dec. 12, 1997, entitled "Laser Microphone," by the same inventor.

This invention was made with Government support under contract number DE-AC02-76CH00016, awarded by the U.S. Department of Energy. The Government has certain rights in the invention.

BACKGROUND OF THE INVENTION

The present invention relates generally to dynamic pressure or density measurement, and, more specifically, to microphones for detecting acoustic energy or sound.

A typical microphone is a transducer which converts acoustic energy into electrical energy. This is typically accomplished by allowing the acoustic energy to vibrate a diaphragm or membrane, with the vibration thereof being converted to an electrical signal indicative of the acoustic energy. However, the diaphragm inherently has mass which affects the ability of the microphone to accurately detect the original acoustic energy.

Various types of microphones are known which vary in sophistication and ability to accurately detect the acoustic energy. The microphones are evaluated by various performance criteria including frequency range and response, dynamic range, sensitivity, and polar pattern or the directional response capability of the microphone.

Of particular interest is the microphone sensitivity which is typically expressed by the output voltage of the microphone for a particular sound pressure level. High microphone sensitivity is desired for discriminating against system noise and other electrical interference.

The polar pattern, or the directional response of the microphone is another important parameter to avoid the detection of unwanted sound or sources while linking the detection capability of the microphone to a specific direction.

The diaphragms are typically made as thin and lightweight as possible to limit their adverse affect on accurately detecting acoustic energy or sound. A low mass diaphragm is desirable for obtaining a flatter frequency response, and improved microphone sensitivity. However, the diaphragm is therefore subject to large excursions in travel under a large pressure wave such as that occurring upon the pronunciation of "P" words. This causes undesirable popping response from the microphone when used for example in a public address speaker system.

Accordingly, it is desired to provide a diaphragm-less microphone for detecting acoustic energy without the typical problems associated with a diaphragm-microphone while obtaining good sensitivity, frequency range and response, and directional response, for example.

SUMMARY OF THE INVENTION

An optical microphone includes a laser and beam splitter cooperating therewith for splitting a laser beam into a reference beam and a signal beam. A reflecting sensor receives the signal beam and reflects it in a plurality of reflections through sound pressure waves. A photodetector receives both the reference beam and reflected signal beam for heterodyning thereof to produce an acoustic signal for the sound waves. The sound waves vary the local refractive index in the path of the signal beam which experiences a Doppler frequency shift directly analogous with the sound waves.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
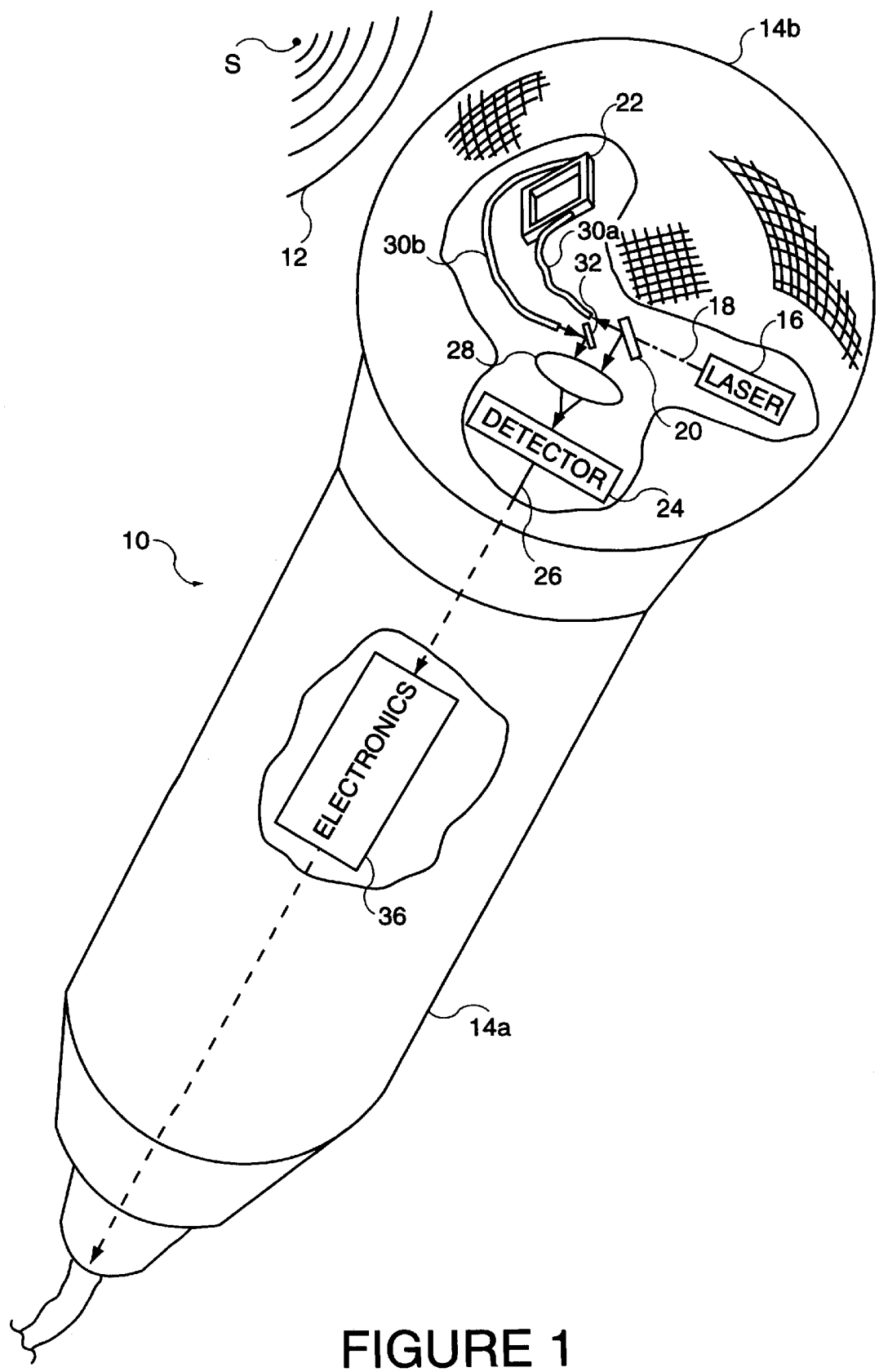
FIG. 1 is an isometric view of an optical microphone in accordance with an exemplary embodiment of the present invention.

Illustrated schematically in FIG. 1 is an optical microphone 10 in accordance with a preferred embodiment of the present invention for detecting acoustic energy in the form of sound pressure waves 12 from an exemplary sound source S. The sound waves 12 may have any dynamic frequency, but are typically in the exemplary audible range of 20–20,000 hz. The microphone 10 is not limited to the audible range but is also capable of detecting acoustic energy below or above the audible range in unlimited acoustic bandwidth, except as limited by the electronic circuitry therefor.

The optical microphone 10 illustrated in FIG. 1 is characterized by the absence of a conventional diaphragm or membrane, but instead directly uses light in the path of the sound waves 12 for the detection thereof. The microphone 10 illustrated in FIG. 1 may take any suitable form for measuring sound waves 12 in a sound propagating medium such as atmospheric air. In the exemplary embodiment illustrated in FIG. 1, the microphone 10 includes a tubular housing 14a configured for being either hand held or mounted to a microphone support, with an optional screened head 14b being attached thereto and being generally transparent to the sound waves 12, as is conventional.

Figure 2:
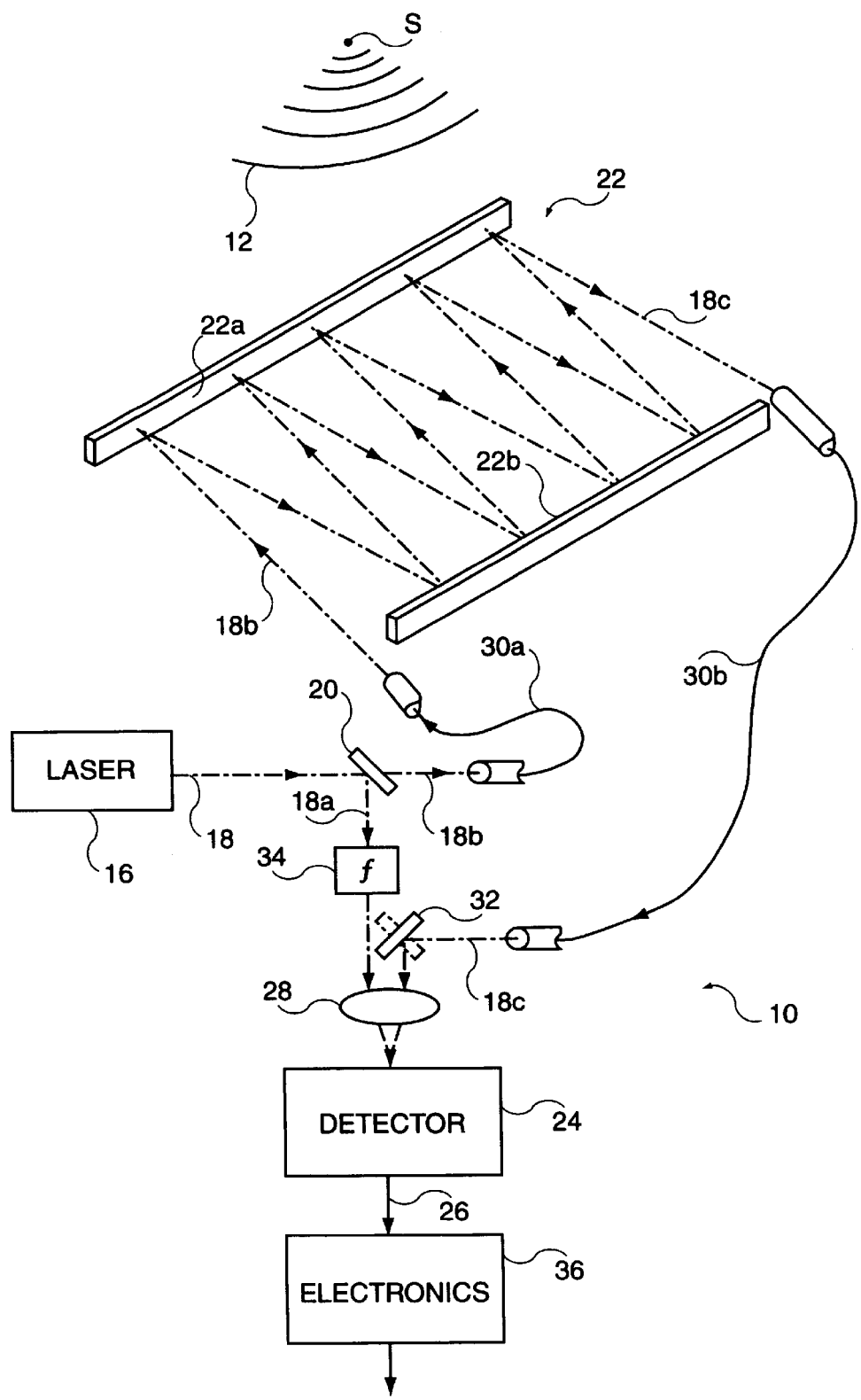
FIG. 2 is a schematic representation of the optical microphone illustrated in FIG. 1.

The functional elements of the microphone 10 illustrated in FIG. 1 are shown schematically in FIG. 2 and include means for emitting a source beam in the form of a laser 16 for emitting an electromagnetic source or laser beam 18. The laser 16 is suitably mounted inside the housing or head of the microphone and may take any conventional form such as a solid state laser, gas laser, or fiber laser. In the preferred embodiment, the laser 16 is a Helium Neon (HeNe)-laser for reducing undesirable system noise in the microphone.

Means in the form of a beam splitter 20 are suitably disposed in optical alignment with the laser 16 for optically splitting the laser beam 18 into two components including a reference laser beam 18a and a sensing or signal laser beam 18b. The laser beam 18 has a fundamental frequency which is several orders of magnitude greater than the frequency of the sound waves 12. The split reference and signal beams 18a,b have substantially the same light frequency and wavelength as the original beam from the laser 16. The beam splitter 20 may take any conventional form such as a partially reflective mirror which reflects a portion of the laser beam 18 as the reference beam 18a while transmitting the remaining portion of the laser beam 18 as the signal beam 18b therethrough.

A reflecting sensor 22 is disposed in optical communication or alignment with the beam splitter 20 for receiving the signal beam 18b and reflecting the signal beam in a plurality of reflections through the sound waves 12. The sensor 22 is an optical-acoustic cell having no moving parts or diaphragm for directly detecting the sound waves 12. Acoustic energy travels through a medium such as air, with the molecules thereof being alternately compressed and rarefied at the corresponding sound frequency and wavelength. The acoustic or pressure waves 12 travel outwardly from the source S and are directional. Instead of using a conventional diaphragm for detecting the sound waves 12, the laser signal beam 18b in the reflecting sensor 22 is used.

The signal beam 18b is directed through the path of the sound waves 12 and probes the density thereof. When molecules of air are compressed, the refractive index thereof is increased and light travels more slowly through a denser medium. When the molecules of air are rarefied, the refractive index is lowered and light travels faster through a less dense medium. Accordingly, the signal beam 18b is directly affected, or acoustically modulated, by the sound waves 12 through which it is directed, which is used in accordance with the present invention for directly detecting the sound waves 12 without a diaphragm.

As shown in FIG. 2, the reflecting sensor 22 is preferably configured to effect the reflections of the signal beam 18b in a common sensor plane to effectively produce a sheet of light through which the sound waves 12 may pass. As the light in the signal beam 18b in that sheet intercepts the sound waves 12 inside the sensor 22, the light travels slower through the compressed or denser molecules of air and faster through the rarefied or less dense molecules of air, respectively, encountered in the different portions of the sound waves. This effects an associated Doppler shift in the frequency of the signal beam 18b with the resulting multiply-reflected signal beam being designated 18c (just before it leaves the sensor 22). The Doppler shifted frequency of the reflected signal beam 18c provides the variable signal source for the microphone which is indicative of the detected sound waves 12.

For example, if the sound waves 12 have a frequency of one kHz, pressure variations in the air encountered by those waves occur at the same frequency. And, the frequency of the signal beam 18b reflected in the sensor 22 will be similarly Doppler shifted at the same frequency and that shift will be contained in the reflected signal beam 18c.

In order to extract or demodulate the affect of the sound waves 12 in the reflected signal beam 18c, a detector 24 or means in the exemplary form of a photodetector are disposed in optical communication or alignment with both the beam splitter 20 and the sensor 22 for receiving and automatically heterodyning the reference beam 18a and the reflected signal beam 18c to produce a resulting electrical acoustic signal 26 representative of the sound waves 12 engaging the sensor 22. The signal beam 18b, 18c has been Doppler shifted by the sound, while the reference beam 18a has not. During heterodyning, the electronic output is the difference between the Doppler shifted and non-Doppler shifted (reference) beams. This is the acoustic signal.

The photodetector 24 may take any conventional form, such as a photodiode or photomultiplier, which produces an output electrical signal from an input optical signal. The Doppler shifted signal which the detector measures will exactly reproduce the frequency pattern of the sound waves 12. Reproduction of the source is exact because there is no mass in the sensor 22 which must vibrate, with the signal beam 18b simply measuring directly the dynamic variation of density of the air molecules through which it passes.

As indicated above, the reflecting sensor 22 is preferably configured to reflect the signal beam 18b in a single-plane sheet of light to provide preferred directional sensitivity in the sensor 22 for the sound waves 12 emanating from the source S. Directionality is provided by the orientation of the sensor 22 for preferably receiving the sound waves 12 moving in a direction generally normal to the light sheet. Sensitivity is increased by the multiple reflections of the signal beam 18b in the sensor 22 for effecting more interactions between the signal beam and the acoustic waves 12.

In the exemplary embodiment illustrated in FIG. 2, the sensor 22 includes a pair of opposing sensor mirrors 22a,b for reflecting the signal beam 18b therebetween. The sensor mirrors 22a,b are suitably spaced apart and aligned to define a sensor plane along which the signal beam is multiply reflected. The sensor plane may be positioned perpendicularly with respect to the direction of sound wave propagation from source S, for maximizing directionality and sensitivity, i.e. the polar pattern detection or directional response capability of the sensor.

The optical-acoustic sensor 22 therefore allows an improved method of optically detecting the sound waves 12 without using a moving-mass diaphragm. Light in the form of the laser beam 18 is emitted from the laser 16 and split in the splitter 20 into the separate reference and signal beams 18a,b. To summarize the operation of the microphone of the invention, the signal beam 18b is reflected inside the sensor 22 for interacting with the sound waves 12 and generating the reflected signal beam 18c which is correspondingly modulated by Doppler shift in frequency in direct response to the sound waves 12. Heterodyning of the reference beam 18a and the reflected signal beam 18c in the detector 24 demodulates the reflected signal beam 18c to produce the resulting acoustic signal 26 which is directly analogous to the sound waves 12.

Heterodyning is a common technique typically found in frequency modulated (FM) radios for transmitting sound through the air, or in motion measuring radar such as those commonly used to enforce traffic speed limits, or in other types of laser based motion detectors. Two signals of different frequency are added together to produce fluctuations or beats of the combined frequencies corresponding to the difference between the two signals. Analogous optical heterodyning is automatically effected in the detector 24 which simultaneously receives the reference signal 18a and the reflected signal beam 18c. Since the reference beam 18a and signal beam 18b are initially substantially identical, the difference between the reflected signal beam 18c and the original reference beam 18a is directly indicative of the variation in density produced by sound waves 12 as they pass through the sheet of light formed by the reflected signal beam 18b, 18c and is readily obtained by heterodyning.

As illustrated in FIG. 2, the microphone 10 preferably also includes a focusing lens 28 disposed in optical communication or alignment between the detector 24 and both the beam splitter 20 and sensor 22 for mixing and focusing together the reference beam 18a and the reflected signal beam 18c. By focusing the two beams together onto the photodetector 24, automatic heterodyning is effected. The focusing lens 28 may be integrated in a system or assembly of suitable optical elements for both focusing and collimating the beams for more efficient heterodyning.

The beam splitter 20, the sensor 22, and the focusing lens 28 may be optically aligned in any suitable manner. In the preferred embodiment illustrated in the Figures, a pair of first and second conventional fiber optic cables 30a and 30b are provided for respectively carrying or transmitting the signal beam 18b from the splitter 20 to the sensor 22 and for returning the reflected signal beam 18c from the sensor 22 to the lens 28 and detector 24, in turn. A suitable relay mirror 32 may be provided between the output end of the second cable 30b and the lens 28 for maintaining compactness of the system. The optical cables 30a and 30b may be used for suitably separating the sensor 22 from the other components of the microphone as desired within the housing 14a and head 14b (see FIG. 1). Furthermore, the optical cables 30a,b reduce or eliminate any unwanted or off-angle (relative to the direction of movement of sound waves 20 from source S) sound from being picked up in the system, by thus generally isolating sound detection with the signal beam to the sensor 22 itself.

Noise is common in any electronic system. For example, the photodetector 24 is a solid state device which is subject to 1/f noise, i.e. proportional to one over the frequency. In order to reduce this component of noise, the microphone 10 preferably also includes means in the form of an optical frequency shifter 34 disposed in optical communication or alignment between the beam splitter 20 and the detector 24, via the lens 28, for optically shifting frequency of the reference beam 18a. The frequency shifter 34 may take any conventional form, such as an acousto-optic frequency shifter, for shifting the optical frequency an effective amount such as in the exemplary range of 2–15 MHz. Correspondingly, the microphone 10 includes suitable electronics in a conventional circuit 36 for resolving the acoustic signal for the amount of shifted frequency of the reference beam 18a.

In one embodiment of an optical microphone built and tested, sensitivity to detect pressure variations in the atmosphere of 0.01 psi was obtained with an effective sensing light path of 20 cm without multiple reflections. Sensitivity can be increased by an order of magnitude, for example, to 0.001 psi by increasing the sensing path length by a factor of 10 using ten reflections between the sensor mirrors 22a,b.

The optical microphone 10 disclosed herein includes various advantages attributable to the elimination of the conventional moving mass or diaphragm used in other kinds of microphones. Improved sensitivity, frequency response, dynamic range, and unlimited bandwidth are exemplary advantages. A significant advantage is the elimination of the popping "P" sounds in the resulting acoustic signal 26 which would otherwise be obtained using a conventional diaphragm type microphone.

Although the invention has been described in an exemplary embodiment using a laser, other means for emitting suitable electromagnetic beams may also be used below and above the optical wavelength spectrum. For example, Maser, microwaves, or ultraviolet beams may be used.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A microphone for detecting sound pressure waves comprising:

emitting means for emitting a source beam;

a beam splitter for splitting said source beam into a reference beam and a signal beam;

a reflecting sensor disposed in communication with said splitter for receiving said signal beam and reflecting said signal beam in a plurality of reflections through and engaging said sound waves; and a detector disposed in communication with both said splitter and said sensor for receiving and heterodyning said reference beam and said reflected signal beam to produce an acoustic signal analogous to said sound waves engaging said signal beam in the sensor.

2. A microphone according to claim 1 wherein said reflecting sensor is configured to effect said reflections in a common sensor plane to provide directional sensitivity for said sound waves engaging the signal beam.

3. A microphone according to claim 2 wherein said reflecting sensor comprises a pair of opposing mirrors for reflecting said signal beam therebetween.

4. A microphone according to claim 3 further comprising a frequency shifter disposed in communication between said beam splitter and detector for shifting frequency of said reference beam.

5. A microphone according to claim 3 wherein said emitting means comprise a laser and said source beam is a laser beam; and further comprising a focusing lens disposed in optical communication between said detector and both said beam splitter and said reflecting sensor for focusing together said reference beam and said reflected signal beam.

6. A microphone according to claim 3 wherein said emitting means comprise a laser and said source beam is a laser beam; and further comprising a pair of fiber optic cables for respectively transmitting said signal beam to said reflecting sensor and returning said reflected signal beam therefrom.

7. A microphone according to claim 3 wherein said emitting means comprise a laser and said source beam is a laser beam; and further comprising:

an optical frequency shifter disposed in optical communication between said beam splitter and detector for optically shifting frequency of said reference beam;

a focusing lens disposed in optical communication between said frequency shifter and said detector;

a first fiber optic cable disposed in optical communication between said beam splitter and said reflecting sensor for transmitting said signal beam thereto; and a second fiber optic cable disposed in optical communication between said reflecting sensor and said focusing lens for returning said reflected signal beam thereto for mixing with said reference beam in said detector.

8. A method of detecting sound pressure waves without a moving mass diaphragm comprising:

emitting a source beam;

splitting said source beam into a reference beam and a signal beam;

reflecting said signal beam in a plurality of reflections through said sound waves; and heterodyning said reference beam and said reflected signal beam to produce an acoustic signal for said sound waves.

9. A method according to claim 8 wherein said signal beam is reflected in a common plane to provide directional sensitivity in detecting said sound waves.

10. A method according to claim 8 further comprising shifting frequency of said reference beam.

11. A method according to claim 8 wherein said source beam is a laser beam for optically detecting said sound pressure waves.

* * * * *

(12) REEXAMINATION CERTIFICATE (4553rd)
United States Patent
Veligdan

(10) Number: US 6,014,239 C1
(45) Certificate Issued: Apr. 9, 2002

(54) OPTICAL MICROPHONE

(75) Inventor: James T. Veligdan, Manorville, NY (US)

(73) Assignee: Brookhaven Science Associates, Upton, NY (US)

Reexamination Request:
No. 90/005,943, Mar. 2, 2001

Reexamination Certificate for:
Patent No.: 6,014,239
Issued: Jan. 11, 2000
Appl. No.: 08/989,350
Filed: Dec. 12, 1997

(51) Int. Cl.$^7$ .................. H04B 10/00; H04B 10/02; H04B 10/12; H04R 25/00
(52) U.S. Cl. .................. 359/172; 359/150; 359/149; 359/151; 359/191; 359/173; 381/170; 381/172
(58) Field of Search .................. 359/149–151, 359/172–173, 191; 381/170, 172

(56) References Cited

FOREIGN PATENT DOCUMENTS

JP           60-18100       1/1985

OTHER PUBLICATIONS

Martin H. Weik, D. Sc., Communications Standard Dictionary, pp. 466–467, 1983.*

* cited by examiner

*Primary Examiner*—Leslie Pascal

(57) ABSTRACT

An optical microphone includes a laser and beam splitter cooperating therewith for splitting a laser beam into a reference beam and a signal beam. A reflecting sensor receives the signal beam and reflects it in a plurality of reflections through sound pressure waves. A photodetector receives both the reference beam and reflected signal beam for heterodyning thereof to produce an acoustic signal for the sound waves. The sound waves vary the local refractive index in the path of the signal beam which experiences a Doppler frequency shift directly analogous with the sound waves.

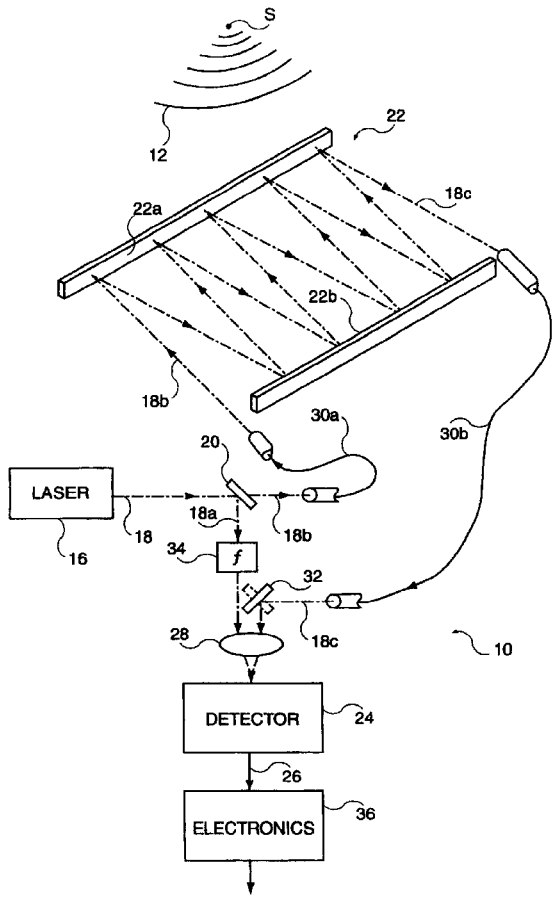

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *